UNITED STATES PATENT OFFICE.

IRA F. PECK, OF AUBURN, RHODE ISLAND, ASSIGNOR TO THE VELDOP COMPANY, OF WILMINGTON, DELAWARE, A CORPORATION OF DELAWARE.

INSECTICIDE.

1,119,036.  Specification of Letters Patent.  Patented Dec. 1, 1914.

No Drawing.  Application filed March 7, 1914.  Serial No. 823,095.

*To all whom it may concern:*

Be it known that I, IRA F. PECK, a citizen of the United States, and resident of Auburn, in the county of Providence and State of Rhode Island, have invented certain new and useful Improvements in Insecticides, of which the following is a specification.

The present invention relates to a composition of matter particularly adapted to be used as an insecticide for exterminating insects which prey upon vegetation.

The composition consists of the following ingredients combined in approximately the proportion stated as follows: arsenic, 15 to 30 per cent.; lime, 85 to 70 per cent.

The preferred mode of combining the before mentioned ingredients is the following: I take a quantity of quicklime, sufficient to produce the desired quantity of the final composition, for instance three hundred to six hundred pounds, and add to it enough water to slake the lime. The water and lime thus brought together are thoroughly mixed and agitated, and combine in the well known manner with evolution of heat, to produce a thick pasty mixture consisting of slaked lime and water. To this mixture is added commercial arsenic in powdered condition, which is thoroughly mixed by stirring or agitation with the lime. Preferably the arsenic is thus added and mixed with the lime while the latter retains the heat generated by the slaking reaction. The arsenic may be added to the lime mixture when the latter is cold, but it is preferable to carry out this admixture while the lime is highly heated, as thereby the final reaction in which the arsenic and lime combine, is carried out more quickly and thoroughly. The resultant substance is a compound containing arsenic and lime in chemical combination, with some free lime, and has sufficient water to produce a pasty consistency.

In using the composition for its designed purpose, the composition is mixed with water in proportions such as to make a thin fluid mixture, capable of passing through a spraying or atomizing device. This fluid mixture is sprayed upon the plants to be treated.

I am not prepared to say what the precise chemical reactions are. It may be that the reaction is as follows:—

$$2Ca(OH)_2 + As_2O_3 = Ca_2As_2O_5 + 2H_2O,$$

the resulting compound being probably an arsenite or basic arsenite of lime. The mixture resulting from my process, I know, contains an arsenic compound in a readily soluble form mixed with an excess of free lime, and in a form suitable for use as an insecticide.

My composition above described is not only fatal to all the insects which are harmful to plants and vegetation generally, but is also a plant food. It has the further valuable characteristic that after drying upon the leaves and stalks of the plants to which it is applied by spraying, as above described, it adheres with such tenacity that it will not be washed off by rain or by the water which may be used in sprinkling or irrigating the plants. I have also found that plants which have been treated with my composition prior to being set out in the ground are immune from the attacks of cut worms.

I claim:

1. An insecticide composition comprising a chemical compound of commercial arsenic and slaked lime, with some free lime, and sufficient water to form a pasty mass, and capable of being mixed with larger quantities of water to be held in suspension therein to provide an insecticidal spray.

2. An insecticide composition, comprising a chemical compound of commercial arsenic and slaked lime substantially of the formula $$2Ca(OH)_2 + As_2O_3 = Ca_2As_2O_5 + 2H_2O,$$

with some free lime, and sufficient water to form a pasty mass, and capable of being mixed with larger quantities of water to be held in suspension therein to provide an insecticidal spray.

In testimony whereof I have affixed my signature, in presence of two witnesses.

IRA F. PECK.

Witnesses:
WILLIAM H. THORNLEY,
THOMAS G. BRADSHAW.